United States Patent Office 3,230,183
Patented Jan. 18, 1966

3,230,183
ADDITION PRODUCTS OF POLYAMINES WITH POLYALKOXY COMPOUNDS AND TEXTILES TREATED THEREWITH
Emery I. Valko, Belmont, Mass., and Giuliana C. Tesoro, Dobbs Ferry, N.Y., assignors to Onyx Chemical Corporation, Jersey City, N.J., a corporation of Delaware
No Drawing. Filed July 7, 1961, Ser. No. 122,399
19 Claims. (Cl. 260—2)

This invention relates to new addition products of aliphatic polyamines with polyalkoxy compounds.

This application is a continuation-in-part of application Serial No. 561,365, filed January 25, 1956, now abandoned.

The invention includes the preparation and application of water soluble addition products of aliphatic polyamines containing at least two primary amino groups with polyalkoxy compounds, and particularly with polyethylene glycol compounds; the new water soluble addition products so produced; and cross-linked insoluble products produced therefrom. The invention also includes an improved method for the finishing of textile materials, and particularly of hydropholic textile materials, to impart durable anti-static finishes thereto and to impart improved dyeing properties thereto.

The polyamines used in the preparation of the products of the invention may be represented by the following general formula $$H_2NR_1H_2$$

where $R_1$ may consist of an uninterrupted, unsubstituted chain of methylene groups (2 to 10), or one or more of the methylene groups may be substituted, or the chain of methylene groups may be interrupted by one or more hetero atoms such as N, O, S and the like.

Examples of such amines suitable for use in preparing the new products are diethylene triamine, bis(3-aminopropyl) amine (commercially available under the name of 3,3'-imino-bis-propylamine), bis(2-aminopropyl) amine (commercially available under the name of dipropylane triamine), hexamethylene diamine, triethylene tetramine, tetraethylene pentamine, ethylene diamine, bis(hexamethylene) triamine, etc. Various amines which are substantially equivalent to those specifically set forth above can also be used, of course, and it is understood that the designation of these specific amines which can be used is for the purpose of illustration and not limitation. Mixtures of amines can be used.

The polyalkoxy compounds used as alkylating agents for the amines in making the new products are polyalkoxy esters and particularly alkylating esters of polyethylene glycols and polyethylene glycol derivatives, in which the polyethylene glycol chain is interrupted by other radicals, represented by the following general formula $$XCH_2CH_2(OCH_2CH_2)_mOR_2O(CH_2CH_2O)_nCH_2CH_2X$$

where $m$ and $n$ are average numbers between 3 and 40 and $R_2$ is a divalent radical such as, for example, $OR_2O$ may be a glycol radical, a dibasic acid radical OCACO where A is the intermediate divalent radical of the dibasic acid, or a diurethane radical OCNHANHCO where A is again the intermediate divalent radical of the diurethane, and where X is the ester-forming residue of an unsubstituted or substituted inorganic acid such as Cl, Br, I, $CH_3SO_3$, $OSO_3H$ and the like.

Where $R_2$ in the above formula is the ethylene group, the alkylating esters are esters of polyethylene glycols represented by the following general formula $$XCH_2CH_2(OCH_2CH_2)_nOCH_2CH_2X$$

where X has the meaning above indicated and where $n$ is an average number between about 3 and 40. For the purposes of this invention, propylene groups and ethylene groups are considered as equivalents and therefore one or more ethylene groups may be replaced by propylene groups.

Examples of such alkylating esters are the diiodides and dichlorides and other inorganic acid esters of polyethylene glycols having average molecular weights of e.g. about 400, about 600, about 1000, etc., or mixtures thereof.

The preparation of the water soluble addition products of this invention, wherein the functional groups of the aliphatic polyamine consist of two primary amino groups, can be represented by the following reaction:

$$H_2NR_1NH_2 + XCH_2CH_2(OCH_2CH_2)_mOR_2O(CH_2CH_2O)_nCH_2CH_2X =$$
$$H\left[\overset{H}{\underset{|}{N}}R_1\overset{H}{\underset{|}{N}}CH_2CH_2(OCH_2CH_2)_mOR_2O(CH_2CH_2O)_nCH_2CH_2\right]_p\overset{H}{\underset{|}{N}}R_1NH_2 + [HX]_p$$

wherein $R_1$, in an aliphatic polyamine having active groups consisting of two primary amino groups, is the residue of the polyamine after the removal of the two primary amino groups. $R_2$ is an organic divalent radical, $m$ and $n$ are average numbers between 3 and 40, and $p$ is an integer greater than 1. X is an described above.

The alkylating polyethylene glycol esters of unsubstituted and substituted inorganic acids are prepared by appropriate esterification reactions. Polyethylene glycol dichlorides can be prepared by reacting polyethylene glycols with thionyl chloride, in the presence of pyridine or other base. Polyethylene glycol diiodides can be prepared by reacting polyethylene glycol dichlorides with equivalent amounts of sodium iodide either in absence of solvent, or in presence of a solvent in which the sodium chloride formed as by-product is essentially insoluble such as acetone. Polyethylene glycol disulfates can be prepared in the form of their ammonium salts by reacting the glycols with equivalent amounts of sulfamic acid. Polyethylene glycol di-p-toluene sulfonates can be prepared by reacting the glycols with p-toluene sulfonyl chloride in presence of equivalent amounts of pyridine (or other base). Polyethylene glycol dimethanesulfonates can be prepared by reacting the glycols with methane sulfonyl chloride in presence of equivalent amounts of pyridine (or other base). The last two esters are examples of organically substituted inorganic acids.

The polyglycol dihalides which contain a dibasic acid radical between the polyglycol chains can be prepared from a dibasic acid or anhydride by esterification with the polyethylene glycol halohydrin. The polyglycol esters which contain a diurethane radical between the polyglycol chains can be prepared by addition-reaction of a polyethylene glycol halohydrin with diisocyanates.

In carrying out the process of reacting the polyamines and the alkylating polyethoxy esters to produce the new reaction products, the polyamines and polyethoxide esters are advantageously used in such a ratio that not much less than one atom of basic nitrogen (other than tertiary) is present for each reactive halogen atom or other ester forming residue. If the amount of basic nitrogen is less, cross-linked addition products will form less readily. After admixture of the starting materials, the addition reaction, namely alkylation of the basic nitrogen, takes place. The reaction will, in some cases, proceed even at room temperature, while in other cases elevated temperatures are used to accelerate the reaction. The alkylation of the primary amine groups of the polyamines by the polyethylene glycol esters of inorganic acids is an addition reaction which converts the primary amine group into a salt of a secondary amine.

The reaction can in some cases be carried out in the absence of a solvent, or in the presence of solvents such as water or organic solvents such as methanol, butanol, isopropanol and the like.

In some cases, it is advantageous to start with proportions of the polyamines and polyethoxide esters, in which there is approximately one basic nitrogen for each reactive halogen or other ester forming residue. The process can also be advantageously carried out using a considerable excess of the polyamine and carrying out the reaction to react a large proportion of the glycol esters to form an intermediate water soluble product, and then to carry out the final cross-linking reaction by further reacting this intermediate product with additional amounts of the glycol ester.

When equivalent quantities of halide and amine are used, for many purposes, it is desirable to carry out the process under such conditions that alkylation proceeds only partially, since, when between 70% and 95% (depending on the nature and ratio of the reagents employed) of the halide or other ester has reacted, formation of insoluble cross-linked polymers may take place. This useful and desirable cross-linking reaction can advantageously be carried out for certain purposes as a subsequent step of the process.

The polyethylene halides and particularly the dichlorides and diiodides are particularly advantageous for reaction with the polyamines in forming the new products. The diiodides react more readily than the dichlorides and will react at ordinary temperatures in water solution. With the dichlorides, higher temperatures are advantageously used. In carrying out the two-step process using an excess of the polyamine in the first step, the less expensive glycol dichlorides can advantageously be used, and in the further reaction of the intermediate water soluble product to form the final cross-linked product, the more reactive glycol diiodides are advantageously used.

The extent to which the reaction of the dihalides has taken place is established by determining the percentage of ionized halide in the reaction product. The ionized halide can be titrated argentometrically. The halogen content in the glycol dihalide is not ionized, but the halide set free by the reaction is ionized.

The reaction of the polyethylene glycol diiodides with the polyamines can be carried out in water solution by allowing the solution to stand at room temperature. The following table shows the reaction of the diiodide of polyethylene glycol of about 600 molecular weight with different polyamines in water solution, the solution containing 25% of the reactants in the proportions indicated. In this table, the percent reaction shows the percentage of ionized iodine and the extent to which the reaction of the diiodide had taken place at the temperature and for the periods of time indicated. All the products were clear, almost colorless solutions of the reaction products in water:

TABLE I

| Amine used and mols | Halide used and mols | Time, hrs. | Temp. | Percent Reaction |
|---|---|---|---|---|
| Hexamethylene diamine, 0.03 | Polyethylene glycol 600 diiodide, 0.03 | 20 | 25° | 56 |
| | | 97 | 25° | 79 |
| Hexamethylene diamine, 0.015+ | Polyethylene | 20 | 25° | 44 |
| Diethylene triamine 0.01 | 600 diiodide, 0.03 | 97 | 25° | 68 |
| Diethylene triamine 0.03 | Polyethylene glycol 600 diiodide, 0.03 | 20 | 25° | 40 |
| | | 97 | 25° | 66 |
| 3,3' imino bis-propylamine 0.03 | Polyethylene glycol 600 diiodide 0.03 | 20 | 25° | 47 |
| | | 97 | 25° | 69 |
| 3,3' imino bis-propylamine 0.03 | Polyethylene glycol 600 diiodide 0.045 | 20 | 25° | 39 |
| | | 97 | 25° | 62 |

In the preparation of cross-linked insoluble polymers by the reaction of the polyamines and glycol diiodides, the polyamine and diiodide can be mixed with or without a solvent and allowed to stand at room temperature to obtain partially alkylated water soluble addition products, and by further heating of the soluble products, for example at 150° C., to obtain cross-linked insoluble gels. The physical properties of the gel will depend on the choice of raw materials, on the ratio of raw materials, and on the time and temperature employed in the final step.

The insoluble products cannot be analyzed directly for percentage of reaction of the iodide by argentometric titration. But by allowing the sample to stand in contact with a 20% aqueous solution of sodium nitrate for several hours, a quantitative ion exchange reaction takes place between the iodide ion of the resin and the nitrate ion of the solution, and the iodide ion thus dissolved can be quantitatively determined argentometrically. The time necessary for the ion exchange reaction to take place depends on the size of the sample and on the amount of resin surface exposed to the sodium nitrate solution.

TABLE II

| Amine used and mols | Halide used and mols | Time and Temp. Curing | Percent Reaction in Gel |
|---|---|---|---|
| Hexamethylene diamine, 0.01 | PEG 600 diiodide, 0.01 | 30 min., 150° | 93 |
| Hexamethylene diamine, 0.005+diethylene triamine, 0.0033 | ___do___ | 30 min., 150° | 93 |
| Hexamethylene diamine, 0.01 | ___do___ | 35 min., 100° | 90 |
| Hexamethylene diamine, 0.005+diethylene triamine 0.0033 | ___do___ | 45 min., 100° | 84 |
| Hexamethylene diamine, 0.01 | ___do___ | 20 min., 150° | 90 |
| Hexamethylene diamine, 0.005+diethylene triamine, 0.0033 | ___do___ | 20 min., 150° | 93 |
| Diethylene triamine, 0.01 | ___do___ | 12 min., 150° | 93 |
| 3,3' imino bis-propylamine, 0.01 | ___do___ | 10 min., 150° | 92 |
| Do | PEG 600 diiodide, 0.015 | 8 min., 150° | 85 |

Table II, on preceding page, illustrates the reaction of polyamines with the diiodide of polyethylene glycol of average molecular weight of about 600 in the absence of a solvent and allowing the exothermic reaction to proceed at room temperatures to obtain the partially alkylated water soluble addition products which were then heated for the time and at the temperature indicated. The percent reaction in the gel obtained was determined by the above method, in which sodium nitrate solution was used to obtain ion exchange and the iodide ion thus dissolved and determined argentometrically.

The production of the insoluble cross-linked polymers in the manner described enables the properties of the products to be determined from the standpoint of the extent of their reaction and their ion exchange properties.

The resins or gels produced as cross-linked insoluble polymers have ion exchange properties and are useful as ion exchange materials.

Instead of producing the insoluble products by themselves, they can be produced in the presence of an inert material or carrier such as silica gel or broken up pieces of Alundum or other refractory as a carrier for the ion exchange products.

The water soluble intermediate products of the invention can advantageously be used for impregnation of textile materials and further heated in situ to yield an insoluble finish. This finish increases the value and usefulness of textile materials. In particular, it reduces the tendency of the textile materials to accumulate electrostatic charges.

It is known to the trade that impregnation of hydrophobic textile materials with certain compounds greatly reduces their tendency to accumulate electrostatic charges. Such compounds are commonly called antistatic agents or finishes. However, practically all these finishes are removed by laundering, or dry-cleaning or by mere rinsing with water.

There is a definite need for a finish or treatment which would impart to textiles the property of dissipating electrostatic charges and which would withstand repeated laundering and dry-cleaning. Such a finish can be termed a durable antistatic finish.

The compounds of the invention, when properly applied to hydrophobic textile materials, act as durable antistatic finishes, extremely resistant to washing and dry cleaning. The appearance and hand of the cloth are not unfavorably affected by the finish, and at the same time it is possible to impart a wide range of properties to the treated cloth (e.g. stiffness, softness, body) by adequately choosing the raw materials for the addition product applied.

Another extremely useful property of our new finishes is to adsorb from an aqueous bath acid dyes and to hold them. Use can be made of this property to dye economically textile materials made from hydrophobic or cellulose fibers. Hydrophobic fibers can be dyed with known methods only with the aid of high pressure or with the assistance of certain compounds called carriers or with a selected and limited group of dyes. These dye methods impose severe limitation on the selection of color and depth of color and they are usually costly.

Our new finish enables the finished fabric to be dyed by members of the large group of acid or wool dyes at comparatively low cost.

An outstanding property of the new finish is to reduce or eliminate the tendency of textile materials consisting of or prepared from hydrophobic fibers and filaments to accumulate electrostatic charges.

Hydrophobic fibers are synthetic fibers which have a comparatively low capacity to retain moisture in comparison with such fibers as cotton, wool and rayon. Such fibers are nylon fibers (e.g. those called nylon 66 which are prepared by condensation of 1,6 hexamethylene-diamine and adipic acid; those called nylon 6 which are prepared by polymerization of 6-amino caproic acid); Orlon acrylic fibers (Orlon is a trademark of the E. I. du Pont de Nemours & Co.) prepared by polymerization of acrylonitrile; Dacron polyester fibers (Dacron is a trademark of the E. I. du Pont de Nemours & Co.) prepared by condensation of terephthalic acid and ethylene glycol; cellulose triacetate fibers (marketed under the trademark Arnel by the Celanese Corporation of America); Dynel fibers (Dynel is a trademark of the Carbide and Carbon Chemical Co. a division of Union Carbide Corp.) which are co-polymers of acrylonitrile and vinyl chloride; Acrilan fibers (Acrilan is a trademark of the Chemstrand Corp.) and similar synthetic fibers.

Textile materials prepared from hydrophobic fibers accumulate electrostatic charges when exposed to rubbing, e.g. in processing, where the filament or fiber and its assemblies are led over guides, or in weaving, or even in use and wear.

In processing, accumulation of electrostatic charges may cause yarn ends to stick or tangle severely on machines. Charged fabrics may attract and hold tenaciously lint and soil, and they are often difficult to cut and sew. Finished garments have a tendency to cling to the body, and spark discharges may also occur, which in some instances (such as in the operating room, in electronic research laboratories, etc.) constitute a significant hazard.

The accumulation of charges is assumed to be due to the inability of the textile materials to dissipate the charges as fast as they are generated by rubbing. An adequate measure of the ability of the textiles to dissipate charges is their electrical conductance (or electrical resistivity is the reciprocal value of conductance). It is known that a specific area conductivity of the textile material higher than $10^{-12}$ reciprocal ohm (i.e., a specific area resistivity lower than $10^{12}$ ohm) is sufficient to consider the textile material as having no objectionable tendency for the accumulation of charges. A higher specific area resistance is usually indicative of the tendency to accumulate charges.

We define the specific area resistivity of the fabric as its electrical resistivity between two parallel metallic electrodes placed at a distance equal to their length. When the distance between electrodes is $n$ times their length, the measured resistance must be divided by $n$ in order to obtain the specific area resistance. The instruments used to measure electrical resistance are well known, e.g. a Wheatstone bridge may be used, or a strip of fabric is placed between electrodes connected across a device for measuring electric potential (voltage) having a very high leakage resistance and a potential is then applied across the fabric; the source of potential is then disconnected from the electrodes. From the observed rate of discharge of the initial potential and from the capacitance of the system the specific area resistivity can be calculated.

The electric resistance of textile materials depends on their moisture content, which in turn is a function of the relative humidity of the surrounding atmosphere. Therefore measurement of electrical resistivity of the fabric must be carried out at a known relative humidity level, in order to give reproducible results. Most of our measurements as indicated in the following examples, were carried out at relative humidity between 30% and 50%.

The invention will be further illustrated by the following examples, but it will be understood that the invention is not limited thereto. The parts are by weight.

Example 1 illustrates a two-step process with the reaction first of 2 mols of diethylene triamine with 1 mol of the dichloride of polyethylene glycol having an average molecular weight of about 600, to produce an intermediate water soluble product; and Example 2 illustrates the finishing of fabric therewith.

In the reaction in which an excess of the polyamine is used, with the glycol dichloride, the hydrochloric acid set free as a result of the addition reaction may remain as the hydrochloride of the amine addition reaction product formed or may be combined with a free amino group to form the hydrochloride. To some extent it may add to unreacted polyamine to form the dihydrochloride. In Example 1, some diethylene triamine dihydrochloride was formed as a precipitate. But when the product of Example 1 is dissolved in water to form a water solution of the reaction product, the dihydrochloride will also go into solution and will be present in the solution for further reaction with diiodide in the second step of the process (Example 2).

*Example 1.*—103 parts of diethylene triamine, 306 parts of polyethylene glycol 600 dichloride and 400 parts of butanol are mixed in a vessel equipped with mechanical stirrer, thermometer and reflux condenser. The mixture is heated with vigorous agitation at the reflux temperature (120° C.) for two hours. A precipitate of diethylene triamine dihydrochloride forms during this heating period. At the end of two hours, argentometric titration indicates that 92.5% of the available chloride has reacted. 100 parts of water are added, and the butanol is vacuum distilled, care being taken that the temperature of the residue does not exceed 70° C. (at 40–60 mm. of Hg). The resulting product is viscous, yellow and completely water soluble. The percentage of active ingredient is determined by oven drying, and the product is then diluted to any desired concentration with water. A solution containing e.g. 50% of active ingredient can then be conveniently prepared, stored and handled.

Example 2 illustrates the use of the water soluble product of Example 1 with the diiodide of polyethylene glycol 600 in finishing fabrics:

*Example 2.*—An undyed, bleached taffeta fabric woven from Dacron polyester yarn is impregnated in a laboratory two roll padder with an aqueous solution containing 12 parts of the product of Example 1 (50% solids—equivalent to the condensation product of 0.014 mols diethylene triamine with 0.007 mol polyethylene glycol 600 dichloride) and 3.1 parts of polyethylene glycol 600 diiodide (equivalent to 0.004 mol) in 85 parts of water.

The cloth is dried for 10 minutes at 50° C. By determining the weight of the dried fabric before and after padding, the so-called dry pickup or add-on is determined. This shows a pickup of 2.2 parts per 100 parts of fabric. The dried fabric is then placed in a curing oven and heated for 5 minutes at 150° C.

Whereas the untreated fabric showed a specific resistance of $10^{14}$ ohm, the cured fabric tested for electrical resistance showed a specific resistance of the order $10^{10}$ ohm at 23° C., and even after 22 launderings (in a Westinghouse household washing machine at 60° with synthetic detergent) the electric resistance remained $10^{10}$ ohm, thus indicating that, while the untreated fabric was unable to dissipate electric charges at a sufficient rate, the treated fabric showed no more tendency to accumulate electrostatic charges than cotton or rayon fabrics.

Example 3 is a modification of the process of Example 1, in which 3 mols of diethylene triamine are reacted with 2 mols of the dichloride of polyethylene glycol 600 to form a water soluble reaction product, and Example 4 illustrates the use of this product with added polyethylene glycol diiodide for the treatment of fabric.

*Example 3.*—154.5 parts of diethylene triamine, 612 parts of polyethylene glycol 600 dichloride and 600 parts of butanol are reacted by the procedure described in Example 1. At the end of two hours, argentometric titration indicates that 98% of the available chloride has reacted. After working up (as in 1), the product is more viscous than the product of Example 1, and is more readily polymerized to an insoluble mass by heating, but a 20% aqueous solution is sufficiently stable to be conveniently stored and handled at room temperature.

*Example 4.*—The fabric is impregnated with an aqueous solution containing 12 parts of the product of Example 3 (60% solids, equivalent to the condensation product of 0.0144 mol of diethylene triamine with 0.0096 mol of polyethylene glycol 600 dichloride) and 0.6 part of polyethylene glycol 600 diiodide in 87.4 parts of water. The cloth is dried and cured in a similar manner to that described in Example 2, and the cured fabric tested for electrical resistance. The product showed a similar resistance to that indicated in Example 2, and the specific resistance was essentially unchanged after 40 launderings.

Similar results to those of the above example were obtained by increasing the amount of polyethylene glycol 600 diiodide present in the solution to 1.2% or 1.6% and accordingly decreasing the amount of condensation products present in the solution.

The following examples illustrate the use of aqueous solutions of the polyamine and polyglycol ester in treating fabrics without first producing the initial reaction product:

*Example 5.*—A desized, bleached, undyed nylon taffeta fabric is impregnated in a laboratory two roll padder with an aqueous solution containing 8.2 parts of the diiodide of polyethylene glycol of average molecular weight 820 and 1.03 parts of diethylene triamine in 90 parts of water. The treating solution is applied 10 minutes (or more) after mixing the ingredients at room temperature. The cloth is dried for 10 minutes at 50° C. By determining the weight of the dried fabric before and after padding, the so-called dry pickup or add-on is determined. This shows a dry pickup of 1.62 parts per 100 parts of fabric. The dry fabric is then placed in a curing oven and heated for 5 minutes at 150° C. The cured fabric is tested for electrical resistance.

Whereas the untreated nylon fabric shows a specific area resistance of the order of $10^{14}$ ohm at 23° C., the treated fabric shows a specific resistance of only $10^9$ ohm. Even after 20 launderings (in a Westinghouse household washing machine at 60° with synthetic detergent), the electric resistance increases only to a value of $10^{10}$ ohm. This indicates that as a consequence of our treatment, the fabric which was unable to dissipate electric charges at sufficient rate now shows no more tendency to accumulate electrostatic charges than cotton or rayon fabrics.

*Example 6.*—An undyed, bleached taffeta fabric woven from Dacon polyester yarn is impregnated with an aqueous solution as described in Example 5 and subjected to the treatment described in Example 5. The dry pickup of the fabric is 2.4 parts per 100 parts of fabric. Whereas the untreated fabric has a specific area resistivity of $10^{15}$ ohm, the treated fabric shows a value of only $10^{8.4}$. After one laundering, the value is $10^{9.2}$, probably due to removal of unreacted electrolytic impurities. This value is essentially unchanged after 5 additional washings.

Whereas the untreated fabric readily picks up soil (e.g. cigarette ash) after rubbing to a woolen fabric, the treated fabric does not shown any such tendency. The hand of the treated fabric is soft and smooth, it falls readily into graceful folds, and it shows only slight yellowing after treatment. After 20 washings, its specific area resistivity is $10^{11.4}$ ohm, which means that is still has practically no tendency to accumulate electrostatic charges.

By increasing the concentration of reactants in the treating solution, and therefore the dry pickup, the effectiveness of the treatment may be even further increased.

One advantage of the fabrics finished according to the present invention is that they can be dyed with aqueous solutions of acid or wool dyes, e.g., with aqueous solutions of Azo Rhodin 2 (Color Index No. 31) to a deep red shade; whereas the untreated fabric remains in the same bath untinted.

The following example illustrates the production of an ion exchange resin from diethylene triamine and the diiodide of polyethylene glycol 600:

*Example 7.*—A mixture of 41.5 parts of polyethylene glycol 600 diiodide and 5.15 parts of diethylene triamine is prepared by mixing the reagants at 30°–40° C., with cooling in a water bath. A viscous syrup is formed. Ten parts of this product (freshly prepared) are mixed intimately with 5 parts of Santocel CX (a commercial brand of silica gel manufactured and sold by the Monsanto Chemical Co.) by grinding in a mortar until a homogeneous solid mix is formed. Upon heating in an oven at 150° C. for 20 minutes, a free flowing, sand colored powder is obtained.

Argentometric titration in presence of sodium nitrate shows 18.3% total exchangeable iodide (calculated 18.4%). A sample of the powder is thoroughly washed with distilled water, and the resulting gelatinous mass is dried in the oven to a powder. Argentometric titration now shows 11.25% total exchangeable iodide, indicating that 39% of the exchangeable iodide was removed by washing.

The ion exchange properties of the resin are illustrated by the following test.

When 200 parts of a 0.5% aqueous solution of Azo Rhodine 2G Conc. are allowed to stand at room temperature for 20 minutes with 1 part of the washed resin described above, and the mixture is filtered, it is found that essentially all of the dye present has been taken up by the resin.

The resin retains is red color when treated with distilled water, and the water in contact with it remains completely colorless.

When the resin is treated with sodium nitrate solution (5%), the red color is immediately released.

*Example 8.*—To 87.6 parts of the product of Example 3 (50% solids) are added 6.2 parts of polyethylene glycol 600 dichloride dissolved in 6.0 parts of water. A clear viscous solution is obtained.

An undyed, bleached Dacron taffeta fabric is impregnated in a laboratory two roll padder with an aqueous solution containing 16 parts of the product described above in 84 parts of water. The cloth is dried for 10 minutes at 120° F. and cured for 15 minutes at 300° F.

After one laundering, the specific area resistance was $2.2 \times 10^{11}$ ohms.

*Example 9.*—To 87.6 parts of the product of Example 3 (50% solids) are added 6.2 parts of polyethylene glycol 600 dichloride and 0.25 part of sodium iodide dissolved in 6.0 parts of water. A clear, viscous solution is obtained.

An undyed, bleached Dacron taffeta fabric is impregnated in a laboratory two roll padder with an aqueous solution containing 16 parts of the product described above in 84 parts of water. The cloth is dried for 10 minutes at 120° F. and cured for 15 minutes at 300° F.

After one laundering, the specific area resistance was $1 \times 10^{10}$ oms. Even after ten launderings, the specific area resistance was $8.1 \times 10^{10}$ oms. Comparison with Example 8 shows that addition of sodium iodide as a curing catalyst greatly improves the durability of the finish.

*Example 10.*—50 parts by weight (½ mol) of succinic anhydride and 210 parts (1 mol) of polyethylene glycol monochloride having an average molecular weight of 210, were heated together with stirring at 130° C. under reflux for 2 hours together with 0.3 part of para toluene sulfonic acid as a catalyst. At the end of this time, the mixture was cooled to 100° C. and 400 parts of toluene were added. Refluxing was continued under azetroping conditions until ½ mol (9 parts) of water was removed. At the end of this time, the toluene was distilled off, leaving a light yellow, viscous liquid.

103 parts of diethylene triamine and 250 parts of the above prepared ester having the following approximate composition:

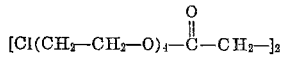

were mixed in a vessel equipped with a mechanical stirred to which 400 parts of n-butanol were added. Reaction was carried out under reflux with vigorous agitation at a temperature of 120° C. for 2 hours. At the end of this time, argentometric titration indicated that 94% of the available chloride had reacted. 100 parts of water were added and the butanol was removed under vacuum below 70° C. The resulting product was a viscous, dark yellow, water-soluble mass. The active content was determined by oven drying and the product diluted with water to 50% active ingredient.

*Example 11.*—An undyed, bleached taffeta fabric woven from Dacron polyester yarn was impregnated in a laboratory two-roll padder with an aqueous solution containing 12 parts of 50% active material prepared in accordance with Example 10 and three parts of polyethylene glycol 600 diiodide dissolved in 85 parts of water.

The cloth was dried for 10 minutes at 50° C. By determining the weight of the dried fabric before and after padding and drying, the dry pickup or add-on was determined to be 2.3 parts per hundred parts of fabric. The dried fabric was then placed in a curing oven and heated for 5 minutes at 150° C.

Whereas the untreated fabric showed a specific resistance of $10^{14}$ ohm, the cured fabric tested for electrical resistance showed a specific resistance in the order of $10^{10}$ ohm at 24° C. After 20 launderings in a household washing machine at 60° C. with synthetic detergent, the electric resistance did not exceed $10^{11}$ ohm. Thus, while the untreated fabric was unable to dissipate electric charges at a sufficient rate to avoid accumulation of static electricity, the treated fabric showed no more tendency to accumulate such electrostatic charges than cotton or rayon.

It will be apparent that filaments and fibers, whether single or multiple strand, may be treated to prevent electrostatic build-up in the same fashion as above-described for fabrics. In general, any hydrophobic fiber or fabric which is susceptible to the accumulation of electrostatic charges may be so treated.

It is to be understood that cross-linking (i.e., curing) of the polyamines on fabric, as shown in Example 11 by use of a polyglycol diiodide, may be carried out equally as well by means of any suitable cross-linking agent such, for example, as polyethylene glycol 200 dichloride, dibromide or diiodide, or polyethylene glycol 400 dichloride, dibromide or diiodide, or polyethylene glycol 600 dichloride or dibromide. In Example 10, instead of reacting a half mol of the dichloroester with one mol of diethylene triamine, 3 mols of diethylene triamine may be reacted with 2 mols of the dichloride, or vice versa, to form a water-soluble reaction product. Use of these products in the manner of Example 11 gave comparable wash-fast elimination of the propensity of the fabric to acquire static electric charges.

In making the intermediate dichloroester of Example 10, instead of 50 parts of succinic anhydride, it is possible to employ 49 parts of maleic anhydride or 74 parts of phthalic anhydride. Dibasic acids may also be used in this preparation such, for example, as 101 parts of sebacic acid or 94 parts of azelaic acid. When a dibasic acid is used in place of the succinic anhydride of Example 10, it is advantageous to remove 1 mol of water (i.e. 18 parts) during azeotropic distillation in order to eliminate the amount stoichiometrically required for the formation of a diester.

Instead of the polyethylene glycol monochloride 210 used in Example 10, a molecularly equivalent amount of polyethylene glycol monochloride 410, polyethylene glycol monochloride 610, polyethylene glycol monochloride 1010, or polyethylene glycol monochloride 1550 may also be used. It is to be understood that these various chlorinated compounds may, if desired, contain propylene groups in addition to or in place of one or more of the ethylene radicals contained therein.

In the production of the polyamines in accordance with Example 10, instead of diethylene triamine, an equimolar amount of ethylene diamine, propylene diamine, dipropylene triamine, bis(3-amino propyl)amine, hexamethylene diamine, triethylene tetramine, tetraethylene pentamine, bis-(hexamethylene) triamine, or the like may be employed.

Most of these products are completely water-soluble and can be used for application to hydrophobic filaments, fibers, and fabrics according to the method of Example 11. In those cases where water solubility is marginal, application is enhanced by use of from 0.5% to 1% (based on the weight of the bath) of a non-ionic dispersing agent such as the ethylene oxide condensate of octyl phenol having an average molecular weight of 600.

*Example 12.*—264 parts (one mol) of bitolylene diisocyanate, having the approximate formula,

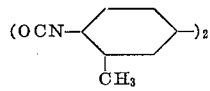

where admixed with 420 parts (two mols) of polyethylene glycol monochloride 210 and allowed to stand with stirring overnight. The resulting dichlorodiurethane having the approximate formula,

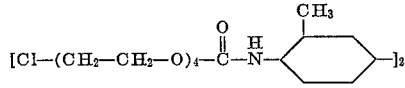

is a very viscous, yellow liquid which is difficultly soluble in water. 342 parts of this material were reacted with 103 parts of diethylene triamine in the manner described in Example 10 for reacting the corresponding ester with diethylene triamine. The product was applied to bleached taffeta Dacron fabric in the way shown in Example 11 with corresponding results.

Instead of bitolylene diisocyanate, an equivalent amount of dianisidine diisocyanate,

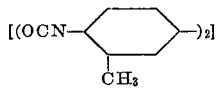

or of methylene bis(4-phenyl) isocyanate,

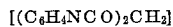

or toluene -2,4-diisocyanate,

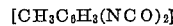

or a mixture of the last named compound with its 2,6 isomer, or of hexamethylene diisocyanate may be used.

Any of the polyglycol monochlorides heretofore listed may be employed in making the corresponding dichloropolyalkoxy urethanes from any of these diisocyanates or their analogues and any of the heretofore listed polyamines may be used to convert the dichloride to polymeric amines containing the urethane group.

In carrying out the reaction of the diisocyanate to form the diurethane, instead of admixing the polyglycol monochloride therewith and allowing the mixture to stand at room temperature, the reaction may be brought about, if desired, in the presence of either benzene or dioxane under reflux conditions, heating during a period of from 2 to 3 hours with subsequent removal of solvent by distillation.

In order to convert the polyalkoxy compounds of this invention to the corresponding polymeric amines, an acid acceptor such as sodium hydroxide, sodium carbonate, sodium bicarbonate and the like may be employed if desired and the reaction may be conducted in the presence of any appropriate solvent such, for example, as ethylene glycol, which need not be removed prior to use in the treatment of fabric, if it is so desired. The reactions may be carried out with any suitable conditions of temperature and pressure.

We claim:

1. A water soluble polyamine having the following formula:

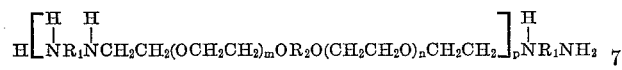

wherein $R_1$, in an aliphatic polyamine having active groups consisting of two primary amino groups, is the residue of the polyamine after the removal of the two primary amino groups, $OR_2O$ is an organic divalent radical of the group consisting of a glycol radical, a diurethane radical, and a dibasic acid radical, $m$ and $n$ are average numbers between 3 and 40, and $p$ is an integer greater than 1.

2. The process of preparing addition products of polyamines which comprises reacting (a) an aliphatic polyamine having active groups consisting of two primary amino groups with (b) a polyethoxy diester of the general formula;

wherein X is selected from the group consisting of chloride, bromide, iodide, sulfate, methane sulfonate, and toluene sulfonate groups, $OR_2O$ is an organic divalent radical of the group consisting of a glycol radical, a diurethane radical, and a dibasic acid radical, and $m$ and $n$ are average numbers of at least 3 and not more than 40 (c) in the presence of an acid acceptor.

3. The process of preparing addition products of polyamines which comprises reacting (a) an aliphatic polyamine containing at least two primary amino groups with (b) a polyethoxy diester of the general formula;

wherein X is selected from the group consisting of chloride, bromide, iodide, sulfate, methane sulfonate, and toluene sulfonate groups, $OR_2O$ is an organic divalent radical of the group consisting of a glycol radical, a diurethane radical, and a dibasic acid radical, and $m$ and $n$ are average numbers of at least 3 and not more than 40.

4. The process of claim 3 in which an acid acceptor is present during the reaction.

5. The process of claim 3 in which the polyamine is a member of the class consisting of diethylene triamine, bis (3-aminopropyl) amine, bis (2-aminopropyl) amine, hexamethylene diamine, triethylene tetramine, tetraethylene pentamine, ethylene diamine, and bis (hexamethylene) triamine.

6. The process of claim 3 in which $R_2$ is —$CH_2CH_2$—.

7. The process of claim 3 in which the polyamine and the polyethoxy diester is reacted in two steps, the proportion of diester and polyamine in the first step being such that the polyamine is present in substantially greater than molecular proportion so that a water soluble reaction product is formed, and in which a further amount of a polyethoxy diester is added in the second step to form a water insoluble cross-linked product.

8. The process of claim 7 in which a dichloride is employed in the first step and a diiodide is employed in the second step.

9. The process for preparing addition products of polyethoxy diesters of the general formula:

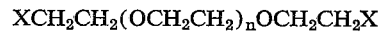

where X is selected from the group which consists of chloride, bromide, iodide, sulfate, methane sulfonate and toluene sulfonate groups, and $n$ is an average number of at least 6 and not more than 40, and of polyamines of the class consisting of diethylene triamine, bis(3-aminopropyl) amine, bis (2-aminopropyl) amine, hexamethylene diamine, triethylene tetramine, tetraethylene pentamine, ethylene diamine, and bis(hexamethylene) triamine, which comprises mixing the polyethoxy diester and the polyamine in the approximate ratio of 1 mol to 1 mol and allowing them to react with each other between 10° C. and 150° C.

10. The process of treating textile materials which comprises:

(A) impregnating a textile material with a water soluble reaction product of (a) a molecular excess of a polyamine having at least two primary amino groups with
(b) a polyalkoxy diester of the general formula:

$$XCH_2CH_2(OCH_2CH_2)_mOR_2O(CH_2CH_2O)_nCH_2CH_2X$$

wherein X is selected from the group consisting of chloride, bromide, iodide, sulfate, methane sulfonate, and toluene sulfonate groups, $OR_2O$ is an organic divalent radical of the group consisting of a glycol radical, a diurethane radical, and a dibasic acid radical,, and $m$ and $n$ are average numbers of at least 3 and not more than 40;

(B) and further reacting the reaction product with an additional amount of a polyalkoxy diester so as to form a water insoluble cross-linked product on the textile material.

11. The process of claim 10 in which the polyamine is a member of the group consisting of diethylene triamine, bis (3-aminopropyl) amine, bis (2-aminopropyl) amine, hexamethylene diamine, triethylene tetramine, tetraethylene pentamine, ethylene diamine, and bis (hexamethylene) triamine.

12. The process of claim 10 in which (a) and (b) are reacted together in the presence of an acid acceptor.

13. The process of claim 10 in which X of the polyalkoxy diester used in preparing the water soluble reaction product is chloride and in which X of the polyalkoxy diester used to form the cross-linked product is iodide.

14. Textile materials impregnated and treated according to the process of claim 10.

15. Textile materials impregnated and treated according to the process of claim 11.

16. Textile materials impregnated and treated according to the process of claim 12.

17. Textile materials impregnated and treated according to the process of claim 13.

18. The process of treating textile materials which comprises:
(A) impregnating a textile material with a water soluble reaction product of
(a) a molecular excess of a polyamine having at least two primary amino groups with
(b) a polyalkoxy diester of the general formula:

$$XCH_2CH_2(OCH_2CH_2)_mO{-}CH_2CH_2$$
$$-O(CH_2CH_2O)_nCH_2CH_2X$$

wherein X is selected from the group consisting of chloride, bromide, iodide, sulfate, methane sulfonate, and toluene sulfonate groups, and $m$ and $n$ are average numbers of at least 3 and not more than 40;

(B) and further reacting the reaction product with an additional amount of a polyalkoxy diester so as to form a water insoluble cross-linked product on the textile material.

19. Textile materials impregnated and treated according to the process of claim 18.

References Cited by the Examiner

UNITED STATES PATENTS

| 2,596,985 | 5/1952 | Cook et al. | 117—139.5 |
| 2,800,464 | 7/1957 | Miller | 260—77.5 |
| 2,835,654 | 5/1958 | Carter et al. | 260—77.5 |
| 2,982,751 | 5/1961 | Anthes | 260—2 |
| 3,021,232 | 2/1962 | Pretka | 260—2 |

FOREIGN PATENTS 554,506   1/1960   Belgium.

WILLIAM H. SHORT, *Primary Examiner.*

HAROLD N. BURSTEIN, *Examiner.*

J. T. BROWN, S. N. RICE, *Assistant Examiners.*

UNITED STATES PATENT OFFICE
CERTIFICATE OF CORRECTION

Patent No. 3,230,183                      January 18, 1966

Emery I. Valko et al.

It is hereby certified that error appears in the above numbered patent requiring correction and that the said Letters Patent should read as corrected below.

Column 1, line 29, for "hydropholic" read -- hydrophobic --; line 35, for "$H_2NR_1H_2$" read -- $H_2NR_1NH_2$ --; column 2, line 30, for "an", second occurrence, read -- as --; column 8, line 73, for "reagants" read -- reagents --; column 9, line 23, for "is" read -- its --; line 62, for "azetroping" read -- azeotroping --; same column 9, line 73, for "stirred" read -- stirrer --.

Signed and sealed this 20th day of December 1966.

(SEAL)

Attest:

ERNEST W. SWIDER
Attesting Officer

EDWARD J. BRENNER
Commissioner of Patents